United States Patent
Suzuki et al.

(10) Patent No.: US 11,292,340 B2
(45) Date of Patent: Apr. 5, 2022

(54) INFORMATION CONVEYANCE METHOD DURING AUTOMATIC DRIVING, AND IN-VEHICLE INFORMATION PRESENTATION DEVICE

(71) Applicant: YAZAKI CORPORATION, Tokyo (JP)

(72) Inventors: Yukio Suzuki, Susono (JP); Kenichi Nagahashi, Susono (JP); Harutoshi Nakajima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 286 days.

(21) Appl. No.: 16/655,993

(22) Filed: Oct. 17, 2019

(65) Prior Publication Data

US 2020/0047618 A1 Feb. 13, 2020

Related U.S. Application Data

(63) Continuation of application No. PCT/JP2018/016506, filed on Apr. 23, 2018.

(30) Foreign Application Priority Data

Apr. 28, 2017 (JP) .............................. JP2017-090566

(51) Int. Cl.
*B60K 35/00* (2006.01)
*B60W 50/14* (2020.01)
(Continued)

(52) U.S. Cl.
CPC .............. *B60K 35/00* (2013.01); *B60W 50/14* (2013.01); *G05D 1/0088* (2013.01);
(Continued)

(58) Field of Classification Search
CPC .............. B60K 35/00; B60K 2370/167; B60K 2370/349; B60K 2370/1868;
(Continued)

(56) References Cited

U.S. PATENT DOCUMENTS

| 6,226,588 B1 | 5/2001 | Teramura et al. |
| 2017/0021765 A1 | 1/2017 | Mori et al. |

(Continued)

FOREIGN PATENT DOCUMENTS

| JP | 2000-118263 A | 4/2000 |
| JP | 2016-182906 A | 10/2016 |

(Continued)

*Primary Examiner* — Michael D Lang
(74) *Attorney, Agent, or Firm* — Sughrue Mion, PLLC

(57) ABSTRACT

The present invention ascertains an action schedule of an automatic driving system when a host vehicle is travelling in an automatic driving mode, and uses an indirect weak expression to convey the action schedule to a driver, at an action schedule presentation start location (P2) which has more leeway with respect to a scheduled action location (P1) (steps S16, S18). In the case of an acceleration/deceleration action schedule, an illuminance distribution of the speedometer dial plate, a virtual pointer or the like is used to express the action schedule such that the driver is able to intuitively ascertain the acceleration or deceleration. In the case of a steering action schedule, the steering direction is expressed using a change in illumination near the steering wheel representing the direction of steering or the like is used.

3 Claims, 9 Drawing Sheets

(51) Int. Cl.
   *G05D 1/00*   (2006.01)
   *B62D 1/06*   (2006.01)

(52) U.S. Cl.
   CPC   *B60K 2370/167* (2019.05); *B60K 2370/1868* (2019.05); *B60K 2370/191* (2019.05); *B60K 2370/349* (2019.05); *B60K 2370/698* (2019.05); *B60W 2050/146* (2013.01); *B62D 1/06* (2013.01); *G05D 2201/0213* (2013.01)

(58) Field of Classification Search
   CPC ....... B60K 2370/191; B60K 2370/698; B60W 50/14; B60W 2050/146; G05D 1/0088; G05D 2201/0213; B62D 1/06
   See application file for complete search history.

(56)   References Cited

U.S. PATENT DOCUMENTS

2018/0065552 A1   3/2018   Mori et al.
   2018/0272934 A1   9/2018   Mori et al.

FOREIGN PATENT DOCUMENTS

JP   2016-196248 A   11/2016
   JP   2017-26417 A    2/2017
   JP   2017-76232 A    4/2017

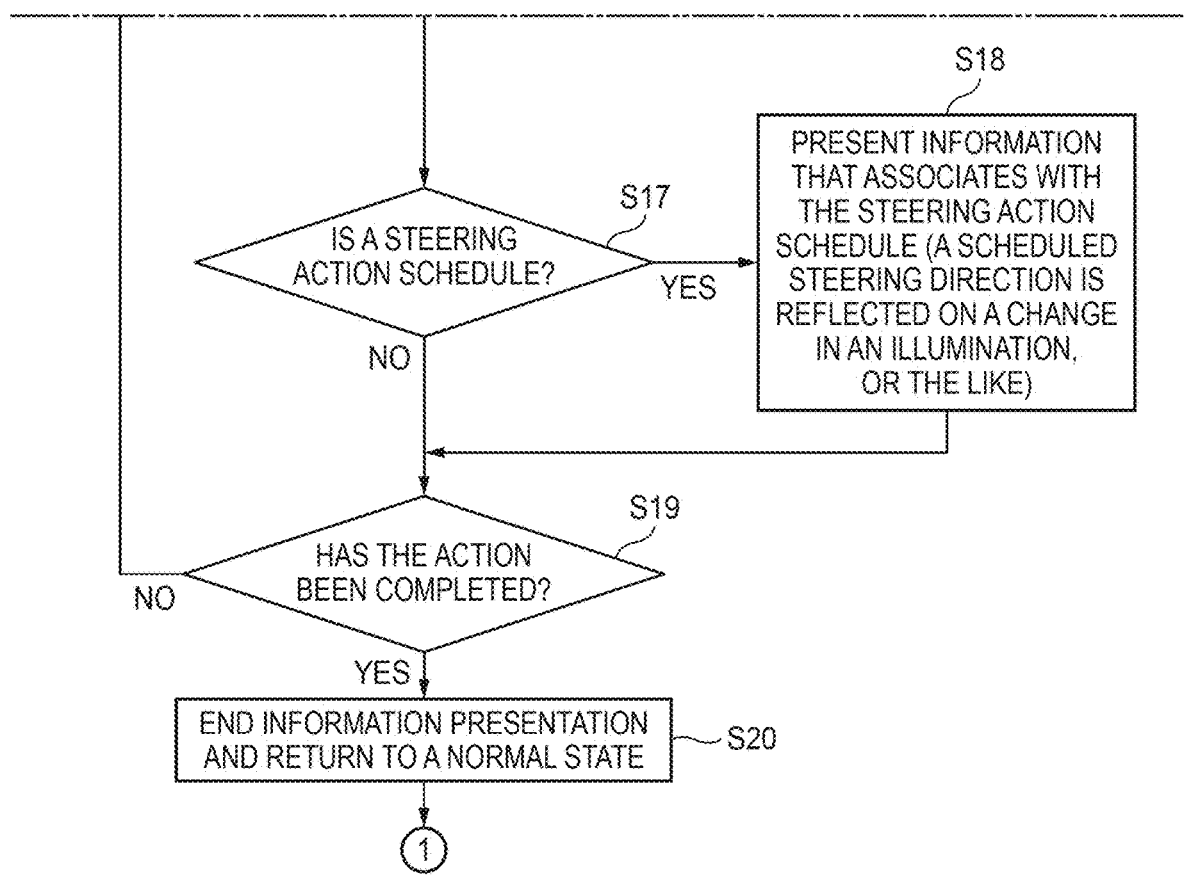

INFORMATION CONVEYANCE METHOD DURING AUTOMATIC DRIVING, AND IN-VEHICLE INFORMATION PRESENTATION DEVICE

CROSS-REFERENCES TO RELATED APPLICATION(S)

This is a continuation of International Application No. PCT/JP2018/016506 filed on Apr. 23, 2018, and claims priority from Japanese Patent Application No. 2017-090566 filed on Apr. 28, 2017, the entire content of which is incorporated herein by reference.

TECHNICAL FIELD

The present invention relates to an automatic driving information transmission method and an in-vehicle information presentation apparatus which can be used in a vehicle capable of automatic driving.

BACKGROUND ART

In an automobile manufacturing industry, a technology for automating a part of a driving operation, and an automatic driving technique in which a system including a computer automatically performs almost all of the driving operations instead of an occupant has been developed (Patent Literature 1 and Patent Literature 2).

A driving assist system of Patent Literature 1 shows a technique for enabling a driver to rapidly grasp a surrounding traffic condition at the time of canceling automatic driving. Specifically, in a case where a switching from the automatic driving to manual driving or a notice of a switching from the automatic driving to the manual driving is received, a display in a meter cluster is shown to display a vehicle speed of an own vehicle, a video image at the rear, an image representing a shape of a road ahead, an image representing an arrangement of a surrounding other vehicle, and images representing a distance to a preceding vehicle and a situation of a periphery of the preceding vehicle.

An information presentation system of Patent Literature 2 has shown a technique for presenting a recognition information of an automatic driving system to an occupant based on an instruction from the occupant. Specifically, a display mode of a display unit is switched based on a display switching instruction of the occupant. In addition, the display modes includes a display mode for displaying a setting information for the automatic driving, a display mode for displaying a traveling information at the time of operation of the automatic driving system, and a display mode for displaying a recognition result information of the automatic driving system.

CITATION LIST

Patent Literature

[PTL 1]: JP-A-2016-182906
[PTL 2]: JP-A-2017-26417

SUMMARY OF INVENTION

Technical Problem

When a vehicle mounted with an automatic driving system is traveling by automatic driving, a situation may be encountered in which the system cannot cope sufficiently, that is, accuracy of recognition or judgment of a situation decreases. Therefore, in the situation, for example, it is assumed that when an automatic driving mode is switched to a manual driving mode (system to driver transfer: handover), the driving of the vehicle is continued by the driver's judgment and a driving operation, or the vehicle is automatically stopped if the driving operation cannot be performed.

Here, in order to smoothly carry out the handover from the automatic driving mode to the manual driving mode, before the handover actually occurs, it is necessary for the system to alert the driver in some way, and prompt the driver to prepare for the handover.

However, various specific situations that the system predicts in the vehicle may actually occur or may not actually occur as much as possible. That is, after the system predicts a possibility of occurrence of the handover, there are a case in which the handover is actually required and a case where the automatic driving is continued without a handover request being actually generated from the system.

Therefore, if the handover request is not generated as a result even though the alerting is performed, the driver feels troublesome by preparing for an unnecessary driving operation. On the other hand, since there is a possibility that the handover actually occurs, it is also necessary to be prepared in advance to some extent so that the driver can perform the smooth handover when a switching request to the manual driving mode occurs.

On the other hand, when the vehicle is traveling by the automatic driving, there is a possibility that an automation surprise also occurs. More specifically, in a case where the driver's idea or prediction is different from the situation of the automatic driving, there is a possibility that the driver feels a sense of distrust with respect to the automatic driving. For example, in a case where the other vehicle changes a course and intercepts in front of an own vehicle, the driver of the own vehicle predicts that the automatic driving of the own vehicle will perform a deceleration operation, but there is a possibility that the automatic driving actually selects a lane change instead of the deceleration. In this case, there is a possibility that the driver hurriedly handles a steering wheel (manual steering), or the driver feels the sense of distrust with respect to the automatic driving.

For example, in a case where the distance between the other vehicle which is the preceding vehicle and the own vehicle approaches, with acceleration/deceleration of the other vehicle traveling in a vicinity of the own vehicle, change in a traveling lane of the other vehicle or the own vehicle, or the like, there is no problem in a case where the recognition of the system related to the situation coincides with the recognition of the driver. However, even if the driver recognizes that the distance between the other vehicle and the own vehicle is approaching, in a case where the automatic driving is performed to make it seem that the system does not recognize the above situation, the driver feels anxiety about the continuation of the automatic driving as it is.

Further, for example, in a case where there is a sharp curve in a road ahead in a state where the own vehicle is traveling by the automatic driving, the occupant such as the driver may feel anxiety about an action schedule of the system. That is, since a fact is that the own vehicle cannot ensure safety by deviating from the traveling lane on the road unless the own vehicle decelerates sufficiently in front of the sharp curve and performs an appropriate steering action, the driver feels anxiety in front of the curve as to whether or not an idea of the driver really coincides with an actual action of the system.

Therefore, in order for the driver to leave driving to the system with confidence in the automatic driving mode, it is important to prevent the occurrence of the automation surprise as described above, and it is also important to eliminate the anxiety of the driver as described above about the action of the system.

The present invention has been made in view of the above circumstances, and an object of the present invention is to provide an automatic driving information transmission method and an in-vehicle information presentation apparatus which are helpful for suppressing anxiety of an occupant such as a driver with respect to an action of a system and ensuring comfort of automatic driving when an own vehicle is traveling by the automatic driving.

Solution to Problem

In order to achieve the above object, the automatic driving information transmission method and the in-vehicle information presentation apparatus according to the present invention are characterized by the following (1) to (7).

(1) An automatic driving information transmission method which presents, on an automatic driving vehicle mounted with an automatic driving control unit configured to recognize situations in front of and around a traveling direction of an own vehicle and generate an action schedule related to driving of the own vehicle based on a result of the recognition, information corresponding to the action schedule to a driver of the automatic driving vehicle, the automatic driving information transmission method including:

in a case where the automatic driving control unit generates the action schedule, at a timing with a margin with respect to a time point at which the action schedule is performed, controlling a display device or an illumination device which can be viewed by the driver; and indirectly representing information related to a target speed of the action schedule by at least one of an area, a direction, and movement of the display or illumination.

According to the automatic driving information transmission method of the above configuration (1), since the driver of the own vehicle can grasp in advance the action schedule of the system which performs the automatic driving based on the transmitted information, it is possible to eliminate anxiety of automatic driving and to obtain a sense of security. For example, in a situation where the own vehicle approaches a sharp curve on a road, the driver can know whether or not a deceleration action or an appropriate steering action is scheduled to be performed by the system, and the driver's anxiety is eliminated. In addition, in a case where the driver feels anxiety with respect to the action schedule of the system, it is also possible to switch to manual driving according to intention of the driver to ensure safety. Moreover, since it is different from an explicit information presentation such as an output of a message, the driver is not stimulated more than necessary, and comfort of the automatic driving is not impaired.

(2) The automatic driving information transmission method according to the above (1), wherein a background area of a speedometer of the own vehicle is divided into at least two background areas with a vicinity of a pointer as a boundary, and the action schedule is indirectly represented by a difference in the display or illumination of the two background areas.

According to the automatic driving information transmission method of the above configuration (2), even if the driver does not read a correspondence relationship between a position of the pointer and the scale of the speedometer, the driver can intuitively and instantaneously grasp a deceleration or acceleration action schedule of the system only by vague visual information.

(3) The automatic driving information transmission method according to the above (1), wherein an arrow pattern or a virtual pointer pattern representing a change in a speed corresponding to the action schedule is displayed in a vicinity of a pointer of a speedometer of the own vehicle.

According to the automatic driving information transmission method of the above configuration (3), even if the driver does not read the correspondence relationship between the position of the pointer and the scale of the speedometer, the driver can intuitively and instantaneously grasp the deceleration or acceleration action schedule of the system only by vague visual information.

(4) The automatic driving information transmission method according to the above (1), wherein a plurality of block-like patterns are displayed on a speedometer of the own vehicle, wherein in a position of each of the block-like patterns, a direction from an outer periphery of the speedometer to a center represents a time axis, and a circumferential direction represents a speed, and wherein in the plurality of block-like patterns, the block-like pattern closest to the outer periphery is arranged at a position representing the current speed in the circumferential direction, and the block-like pattern close to the center is arranged so as to be closer to a position representing a target speed of the action schedule in the circumferential direction.

According to the automatic driving information transmission method of the above configuration (4), the driver can intuitively and instantaneously grasp that there is a deceleration or acceleration action schedule from a shape of the block-like pattern displayed on the speedometer.

In addition, the speed used as a target can also be grasped by the action schedule.

(5) The automatic driving information transmission method according to the above (1), wherein a display or an illumination moving in a steering direction corresponding to the action schedule is output on or in a vicinity of a steering wheel of the own vehicle.

According to the automatic driving information transmission method of the above configuration (5), the driver can intuitively and instantaneously grasp a steering action schedule performed by the system based on visual information.

(6) An in-vehicle information presentation apparatus which is configured to present, on an automatic driving vehicle mounted with an automatic driving control unit configured to recognize situations in front of and around a traveling direction of an own vehicle and generate an action schedule related to driving of the own vehicle based on a result of the recognition, information corresponding to the action schedule to a driver of the automatic driving vehicle, the apparatus including:

an information output control unit configured to output information related to the action schedule, wherein the information output control unit is configured to control a display device or an illumination device which can be viewed by the driver, and indirectly represent information related to a target speed of the action schedule by at least one of an area, a direction, and movement of the display or illumination at a timing with a margin with respect to a time point at which the action schedule is performed, in a case where the automatic driving control unit newly generates the action schedule.

According to the in-vehicle information presentation apparatus having the above configuration (6), since the driver of the own vehicle can grasp in advance the action schedule of the system which performs the automatic driving based on the transmitted information, it is possible to eliminate anxiety of automatic driving and to obtain a sense of security.

(7) The in-vehicle information presentation apparatus according to the above (6), wherein the information output control unit displays a plurality of block-like patterns on a speedometer of the own vehicle, wherein in a position of each of the block-like patterns, a direction from an outer periphery of the speedometer to a center represents a time axis, and a circumferential direction represents a speed, and wherein in the plurality of block-like patterns, the block-like pattern closest to the outer periphery is arranged at a position representing the current speed in the circumferential direction, and the block-like pattern close to the center is arranged so as to be closer to a position representing a target speed of the action schedule in the circumferential direction.

According to the in-vehicle information presentation apparatus having the above configuration (7), the driver can intuitively and instantaneously grasp that there is a deceleration or acceleration action schedule from a shape of the block-like pattern displayed on the speedometer. In addition, the speed used as a target can also be grasped by the action schedule.

Advantageous Effects of Invention

According to the automatic driving information transmission method and the in-vehicle information presentation apparatus of the present invention, it is possible to provide information which are helpful for suppressing the anxiety of an occupant such as the driver with respect to the action of the system, when the own vehicle is traveling by the automated driving. In addition, by transmitting the information in an indirect expression, the driver is not stimulated more than necessary, and the comfort of the automatic driving is not impaired.

DESCRIPTION OF EMBODIMENTS

A specific embodiment of the present invention will be described below with reference to the drawings.
<Overview of Automatic Driving Information Transmission Method>
<Specific Example of Environment in Which Automatic Driving Information Transmission Method is Used>

Figure 1:
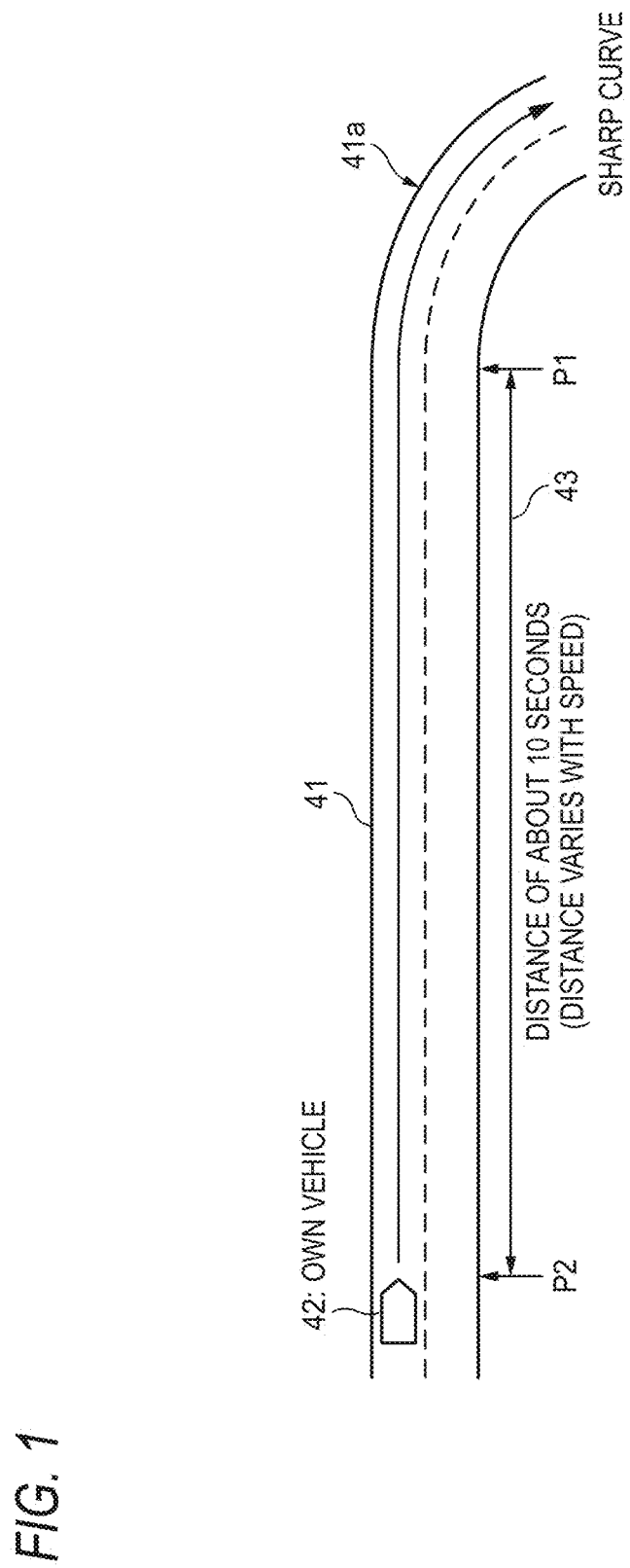
FIG. 1 is a plan view showing a specific example of a relationship between a road, an own vehicle, and points.

A specific example of a relationship between a road, an own vehicle, and points is shown in FIG. 1.

In the example shown in FIG. 1, it is assumed that an own vehicle 42 mounted with an automatic driving system is approaching a sharp curve point 41a in a state of traveling on a road 41 in an automatic driving mode corresponding to a "Level 3".

At the level 3 (LV3) of an automation level specified by the Japanese government or the National Highway Traffic Safety Administration (NHTSA), the system performs all controls of acceleration, steering, and braking of the vehicle, and thus a driver usually only needs to monitor a driving situation. In addition, the monitoring of the driver is not always necessary. However, even in the case of the level 3, when the system makes a request when emergency or when accuracy of the system decreases, it is necessary for the driver to respond to the request. That is, it is necessary to handover (H/O) a responsibility of driving from the system to an manual operation of the driver so as to shift from the level 3 to a level 2 (LV2) or the like having a lower automation rate. At the level 2, the system automatically performs a plurality of operations of the acceleration, steering, and braking of the vehicle. In addition, at the Level 2, the driver needs to constantly monitor the driving situation and perform a driving operation as necessary.

Normally, in the situation shown in FIG. 1, in order to pass the sharp curve point 41a at a safe speed, when the own vehicle 42 reaches near a scheduled action point P1 in front of it, after the own vehicle 42 performs a sufficient deceleration operation, it is necessary to enter the sharp curve point 41a while appropriately steering to a right direction.

Therefore, in a case where an occupant sitting in a driver seat of the own vehicle 42, that is, the driver is monitoring the driving situation of the own vehicle 42 while being anxiety about an action of the system, the following situation occurs.

That is, as shown in FIG. 1, since the driver does not know whether or not the automatic driving system decelerates near the scheduled action point P1 from time when the own vehicle 42 approaches the sharp curve point 41a to some extent to immediately before reaching the sharp curve point 41a, the driver will watch the situation for about 10 seconds while holding the anxiety, for example. In a case where the driver feels that the deceleration does not start even when approaching the scheduled action point P1, the driver is highly likely to step on a brake to perform the deceleration operation according to his/her own judgment and operation. However, in a case where the automatic driving system is scheduled to act the deceleration operation immediately thereafter, it means that the driver's judgment is incorrect. In addition, in this situation, the driver cannot feel comfort of automatic driving.

<Intention of Automatic Driving Information Transmission Method>

Therefore, for example, if the driver can grasp an action schedule of the automatic driving system near the scheduled action point P1 shown in FIG. 1 in advance, it becomes clear at an early stage whether or not the recognition of action schedule of the driver and the action schedule of the automatic driving system coincide with each other, so that the automatic driving system can eliminate the driver's anxiety.

Therefore, in the automatic driving information transmission method of the present invention, for example, in the situation shown in FIG. 1, the action schedule of the automatic driving system near the scheduled action point P1 is transmitted to the driver at a scheduled action presentation start point P2 before the scheduled action point P1 by a margin distance (not necessarily constant) 43.

However, when the automatic driving system, for example, frequently uses a message output such as "slow soon" and "turn right" to clearly transmit information to the driver, the driver who is not actually driving feels that such a message is very troublesome, and the comfort of the automatic driving is impaired.

Therefore, in the automatic driving information transmission method of the present invention, the information on the action schedule of the automatic driving system is transmitted to the driver casually using a relatively weak expression form, so that the driver does not feel troublesome. A specific example will be described later.

<Configuration Example of In-Vehicle System>

Figure 2:
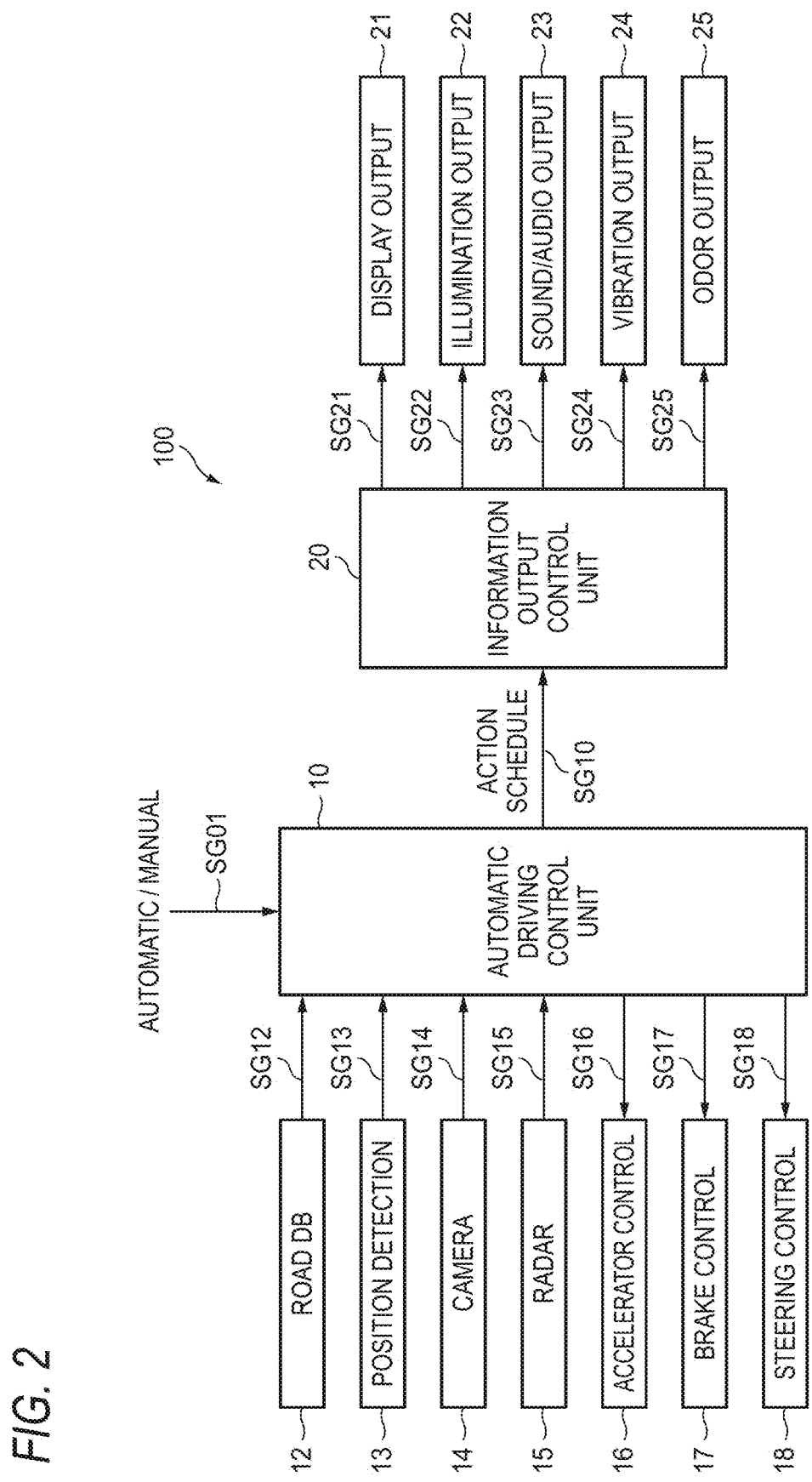
FIG. 2 is a block diagram showing a configuration example of a main part of an in-vehicle system which implements the present invention.

FIG. 2 shows a configuration example of a main part of an in-vehicle system which implements the automatic driving information transmission method of the present invention. The in-vehicle system includes a function for automatically driving an automobile, and an in-vehicle information presentation apparatus 100 configured to present information related to the automatic driving to the driver.

The in-vehicle system shown in FIG. 2 includes an automatic driving control unit 10, a road map database (DB) 12, a position detection unit 13, an in-vehicle camera 14, a radar 15, an accelerator control unit 16, a brake control unit 17, and a steering control unit 18 as components necessary for automatically driving the automobile.

The road map database (DB) 12 stores and holds in advance a wide range of road maps including a road on which the own vehicle is currently traveling, and various information related to the road. The information such as a map stored in the road map database 12 is input to the automatic driving control unit 10 as input information SG12.

The position detection unit 13 can calculate the latest position information representing the current position of the own vehicle by receiving and using radio waves such as a global positioning system (GPS) satellite, for example. The position information is input to the automatic driving control unit 10 as input information SG13.

The in-vehicle camera 14 can capturing a video image representing a surrounding situation such as the front, the rear, and sides of a traveling direction of the own vehicle, and output a video image signal. The video image signal is input to the automatic driving control unit 10 as input information SG14.

The radar 15 can detect the presence or absence of an obstacle for example a preceding vehicle, an inter-vehicle distance between the preceding vehicle and the own vehicle, or the like by a detection function using radio waves such as millimeter waves. Information detected by the radar 15 is input to the automatic driving control unit 10 as input information SG15.

The accelerator control unit 16 includes an electrically controllable actuator which is necessary for automatically adjusting an accelerator opening degree of the own vehicle. According to an output signal SG16 output from the automatic driving control unit 10, the accelerator control unit 16 can adjust the accelerator opening degree.

The brake control unit 17 includes an electrically controllable actuator connected to a brake mechanism of the own vehicle. According to an output signal SG17 output from the automatic driving control unit 10, the brake control unit 17 can control ON/OFF and a braking force of the brake of the own vehicle.

The steering control unit 18 includes an electrically controllable actuator connected to a steering mechanism of the own vehicle. According to an output signal SG18 output from the automatic driving control unit 10, the steering control unit 18 can move the steering mechanism of the own vehicle or generate an assisting torque for assisting a steering force of the driver.

The automatic driving control unit 10 is an electronic control unit (ECU) for controlling the automatic driving of the automobile, and has a function corresponding to the automatic driving at the level 2 (LV2) or the level 3 (LV3) of the automation level specified by the Japanese government or the National Highway Traffic Safety Administration (NHTSA), for example.

At the level 2, the system automatically performs the plurality of operations of the acceleration, steering, and braking of the vehicle. However, at the level 2, the driver needs to constantly monitor the driving situation and perform the driving operation as necessary.

On the other hand, at the level 3, since the system performs all controls of the acceleration, steering, and braking of the vehicle, the driver usually only needs to monitor the driving situation. In addition, the driver does not necessarily need to monitor the situation. However, even in the case of the level 3, when the system makes a request when emergency or when the accuracy of the system decreases, it is necessary for the driver to respond to the request. That is, it is necessary to handover (H/O) the responsibility of the driving from the system to the manual operation of the driver so as to shift from the level 3 to the level 2 or the like having a lower automation rate.

The automatic driving control unit 10 can perform an acceleration control of the own vehicle by giving an instruction to the accelerator control unit 16 using the output signal SG16. The automatic driving control unit 10 can perform a braking control of the own vehicle by giving an instruction to the brake control unit 17 using the output signal SG17. In addition, the automatic driving control unit 10 can perform a steering control of the own vehicle by giving an instruction to the steering control unit 18 using the output signal SG18.

By analyzing the video image of the in-vehicle camera 14, the automatic driving control unit 10 can calculate an appropriate position of the own vehicle in the left-right direction by grasping white lines in a traveling lane boundary and a position of the own vehicle in a left-right direction, and grasp a situation of the curve of the road ahead or the like. Therefore, for example, the automatic driving control unit 10 can realize a lane maintaining assistance function of automatically controlling the own vehicle to travel at a center position of the traveling lane on the road, for example.

Based on a result of analyzing the video image of the in-vehicle camera 14, and position and distance information of the preceding vehicle detected by the radar 15, the automatic driving control unit 10 can automatically perform acceleration and deceleration such that the inter-vehicle distance between the preceding vehicle and the own vehicle is maintained within a safe range, for example. That is, an adaptive cruise control system (ACC) can be realized.

Based on a target point determined in advance, the current position detected by the position detection unit 13, the road map of the road map database 12, or the like, the automatic driving control unit 10 can calculate an appropriate travel route on the road on which the own vehicle is to travel, and predict a change in a curve or the like of the road ahead. In addition, prediction accuracy can also be improved by reflecting the analysis result of an actual video image of the in-vehicle camera 14.

The automatic driving control unit 10 can receive an automatic/manual switching instruction SG01 generated by a switch operation of the driver or the like, and perform a handover for shifting from the level 3 to a level 2 or the like having a lower automation rate.

In the level 3 automatic driving mode, the automatic driving control unit 10 can appropriately control the acceleration, deceleration, and steering according to an actual situation of the road or a situation such as the surrounding other vehicle. For example, since the shape of the road or the like can be grasped in advance based on map data, at the sharp curve in the road, in order to be able to drive in a safe state, the output signals SG16, SG17, and SG18 are controlled so that the own vehicle can be sufficiently decelerated before entering the point, and the own vehicle can travel along a route substantially passing through the center of the traveling lane while appropriately steering according to the shape of the traveling lane.

That is, in the situation where the own vehicle is approaching the sharp curve on the road, the automatic driving control unit 10 can generate in advance an appropriate action schedule of the acceleration, deceleration, and steering related to the automatic driving of the own vehicle. In addition, an appropriate correction can be added to the action schedule reflecting a change in a situation such as the surrounding other vehicle.

In the present embodiment, the automatic driving control unit 10 outputs the action schedule as described above as action schedule information SG10. That is, the action schedule information SG10 includes a type of an action related to the action schedule of the acceleration, deceleration, and steering, a size of an operation amount, position information of the corresponding point, a timing of the action schedule, or the like. The action schedule information SG10 is input to an information output control unit 20.

The information output control unit 20 is an electronic control unit (ECU) which performs a control for presenting information necessary for the automatic driving to the driver. Incidentally, the automatic driving control unit 10 and the information output control unit 20 shown in FIG. 2 may be integrated.

The in-vehicle information presentation apparatus 100 of the present embodiment includes at least one of a part of functions in the automatic driving control unit 10, the information output control unit 20, a display output device 21, an illumination output device 22, a sound/audio output device 23, a vibration output device 24, and an odor output device 25.

The display output device 21 corresponds to display equipment such as a meter unit or a center display mounted on the vehicle, for example, arranged at a position where the occupant driving the vehicle at a driver seat can easily view.

The illumination output device 22 corresponds to various indoor illumination equipment mounted on the vehicle. The sound/audio output device 23 corresponds to various types of hearing output equipment including an audio apparatus or the like. The vibration output device 24 is a device capable of generating a mechanical vibration by an electrical control. The vibration output device 24 is attached or connected to a seating portion of the driver seat or a steering wheel so that the driver can recognize the vibration as a tactile sense or the like when driving.

The odor output device 25 is a device capable of generating a specific odor in a vehicle interior by an electrical control. The odor output device 25 is installed, for example, inside a car air conditioner, and can spray a fragrance or spread the odor into a space in the vehicle interior by blowing air.

For example, according to the action schedule information SG10 input from the automatic driving control unit 10, the information output control unit 20 can select one of the display output device 21, the illumination output device 22, the sound/audio output device 23, the vibration output device 24, and the odor output device 25, or can combine a plurality of them to present necessary information to the driver. By selectively using various types of output devices as necessary, the information output control unit 20 can present information in various types of forms and adjust an intensity of information presentation.

That is, the in-vehicle information presentation apparatus 100 can notify the driver in advance of the information on the action schedule of the automatic driving system, for example, information related to a target speed, before reaching the corresponding scheduled action point. Therefore, based on the transmitted information, the driver can grasp the situation of the automatic driving with a margin for the action schedule of the system.

For example, the in-vehicle information presentation apparatus 100 can present the action schedule of the deceleration or steering of the own vehicle near the scheduled action point P1 shown in FIG. 1 to the driver at the scheduled action presentation start point P2 before the scheduled action point P1. By recognizing in advance that the appropriate action schedule which he/she thinks coincides with the action schedule of the system, the driver can watch the situation of the automatic driving without feeling anxiety.

<Operation Example of In-Vehicle System>

Figure 3:
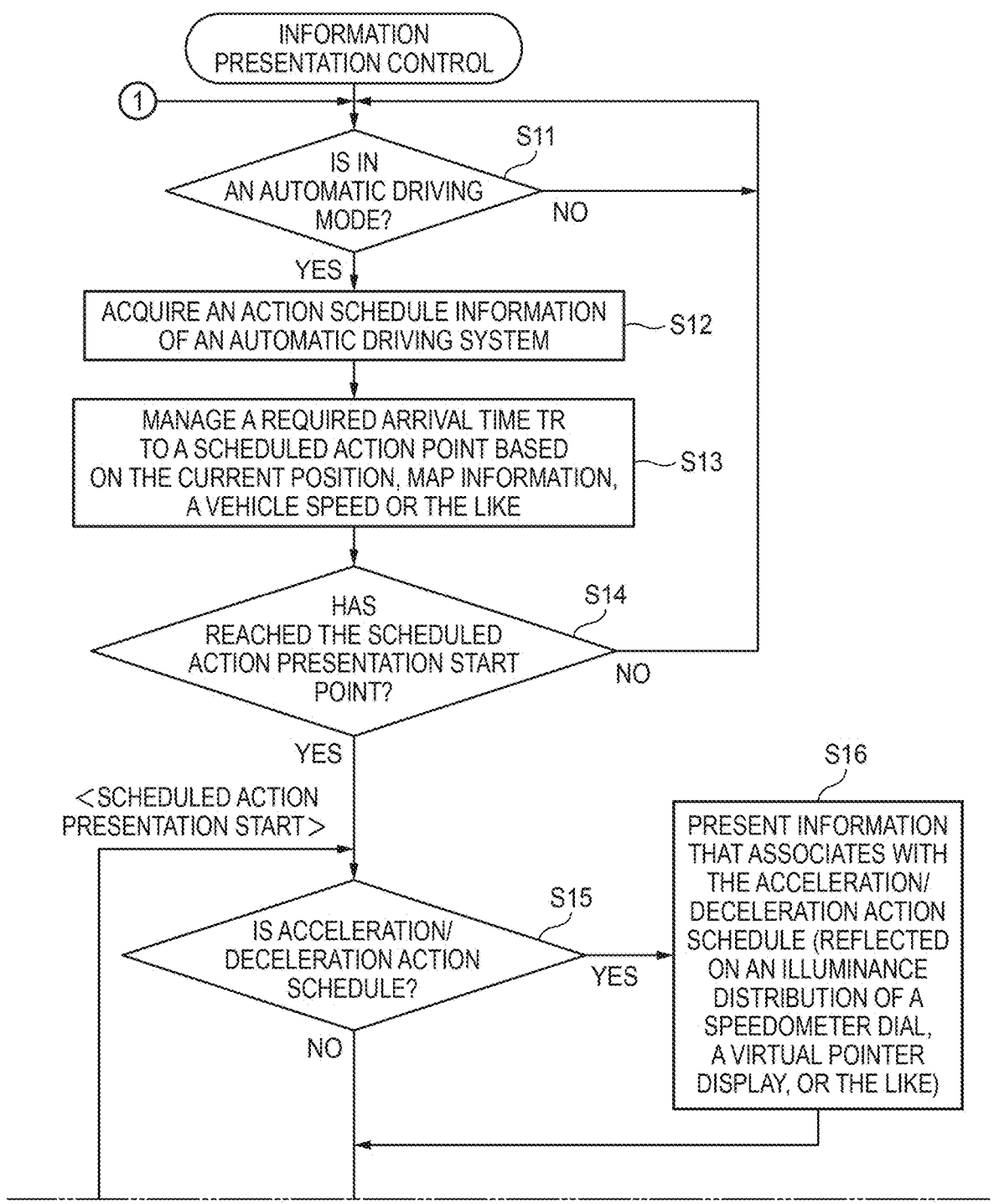
FIG. 3 is a flow chart showing an operation example of a characteristic in-vehicle system in a case of implementing the present invention.

FIG. 3 is an operation example of a characteristic in-vehicle system in the case of implementing the present invention. That is, the automatic driving control unit 10 or the information output control unit 20 shown in FIG. 2 performs the "information presentation control" shown in FIG. 3. The operation shown in FIG. 3 will be described below.

In a case where the own vehicle is traveling in the automatic driving mode (level 3), the automatic driving control unit 10 or the information output control unit 20 sequentially acquires the latest action schedule information generated by the automatic driving system (S11, S12).

The automatic driving control unit 10 or the information output control unit 20 manages a required arrival time Tr to the scheduled action point P1 based on the current position, a vehicle speed, the map information, or the like of the own vehicle (S13). The automatic driving control unit 10 or the information output control unit 20 compares a distance between the scheduled action presentation start point P2 and the scheduled action point P1, or a time difference (for example, constant) between the scheduled action presentation start point P2 and the scheduled action point P1 and the required arrival time Tr to identify whether or not the own vehicle has reached the scheduled action presentation start point P2 (S14).

When the own vehicle reaches the scheduled action presentation start point P2, the information output control unit 20 identifies whether or not the type of the corresponding action schedule is acceleration or deceleration in S15, and performs a step S16 in the case of the acceleration or deceleration.

In step S16, the information output control unit 20 presents the information on the action schedule to the driver using a special expression form that associates the driver with the acceleration or deceleration action schedule. For example, as will be described later, the information is presented so as to associate the driver with the acceleration or deceleration action schedule of the own vehicle using a method such as an illuminance distribution of a speedometer dial or a virtual pointer display.

When the own vehicle reaches the scheduled action presentation start point P2, the information output control unit 20 identifies whether or not the type of the corresponding action schedule is a steering action in S17, and performs a step S18 in the case of the steering action.

In step S18, the information output control unit 20 presents the information on the action schedule to the driver using a special expression form that associates the driver with the steering action schedule. For example, as will be described later, a scheduled steering direction is reflected on a direction of a change in an illumination, or the like.

The information output control unit 20 identifies in S19 whether or not the action has been completed (may be started or not) for the action schedule presented in S16, S18, and continues the information presentation in S16 or S18 if the action is not completed. Further, when the action is completed, the information presentation performed in S16, S18 is ended, and the display and the illumination are returned to a normal state (S20).

<Specific Example of Expression Form of Information Transmission>
<Case of Using Portion of Analog Speedometer>

Figure 4A:
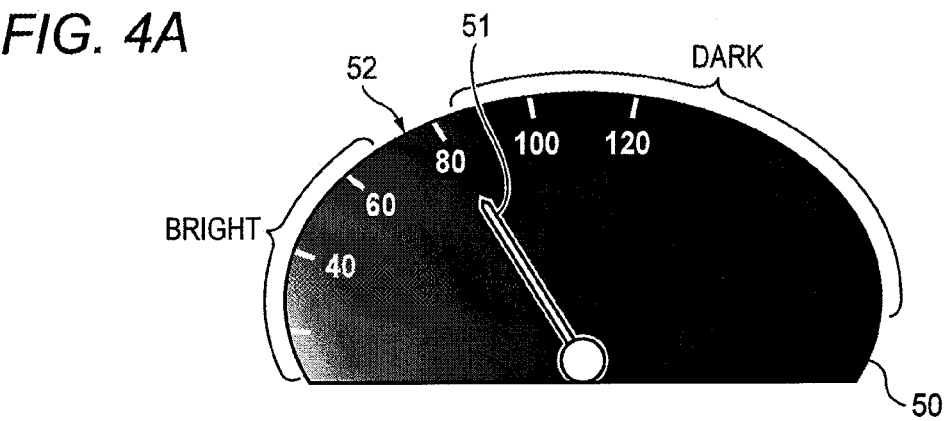
FIGS. 4A, 4B, and 4C are front views showing specific examples of expression forms in a case of transmitting information using an analog speedometer.

Specific examples of an expression form in a case of transmitting the information using an analog speedometer including a pointer, a dial, and a scale are shown in FIGS. 4A, 4 (*b*), and 4 (*c*), respectively.

<Expression Form of FIG. 4A>

In the expression form shown in FIG. 4A, a distribution state of a brightness of an illumination which illuminates a background of a dial of an analog speedometer 50 is controlled to a special state. That is, an area of the dial is divided into two areas with a position approximately coinciding with a direction of a pointer 51 as a boundary, and the brightness is different between an area having a lower speed range than a speed (80 [km/h] in the example of FIG. 4A) indicated by the pointer 51 and an area having a high speed range.

That is, in the example shown in FIG. 4A, since the area having the lower speed range than the speed indicated by the pointer 51 is brighter than the area having the high speed range, the driver can associate that an action of decreasing the vehicle speed is scheduled to be performed. Conversely, by controlling the area having the higher speed range than the speed indicated by the pointer 51 be in a brighter state than the area having the low speed range, the driver can associate that an action of increasing the vehicle speed is scheduled to be performed.

The difference in the brightness between the two areas may be automatically adjusted according to a degree of acceleration/deceleration (acceleration/deceleration) in the action schedule. In addition to the brightness, a hue of the illumination may be controlled.

Figure 4B:
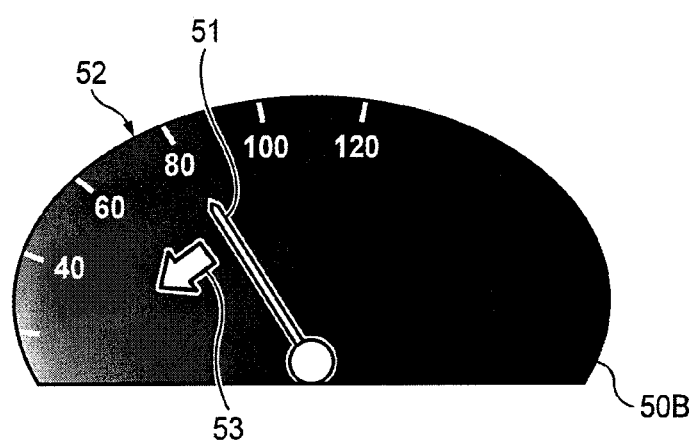

<Expression Form of FIG. 4B>

On the other hand, in the expression form shown in FIG. 4B, an arrow pattern 53 directed toward a lower speed than the speed indicated by the pointer 51 is displayed in the vicinity of the pointer 51 of a dial of an analog speedometer 50B.

Therefore, in the example shown in FIG. 4B, the driver can associate that an action of decreasing the vehicle speed is scheduled to be performed. Conversely, if the arrow pattern 53 directed toward a higher speed than the speed indicated by the pointer 51 is displayed, the driver can associate that an action of increasing the vehicle speed is scheduled to be performed.

A size and thickness of the display of the arrow pattern 53 shown in FIG. 4B may be automatically adjusted according to the degree of acceleration/deceleration (acceleration/deceleration) in the action schedule. In addition, instead of the arrow pattern 53, a shape of the pointer 51 itself may be deformed to express the same situation as the arrow pattern 53.

Figure 4C:
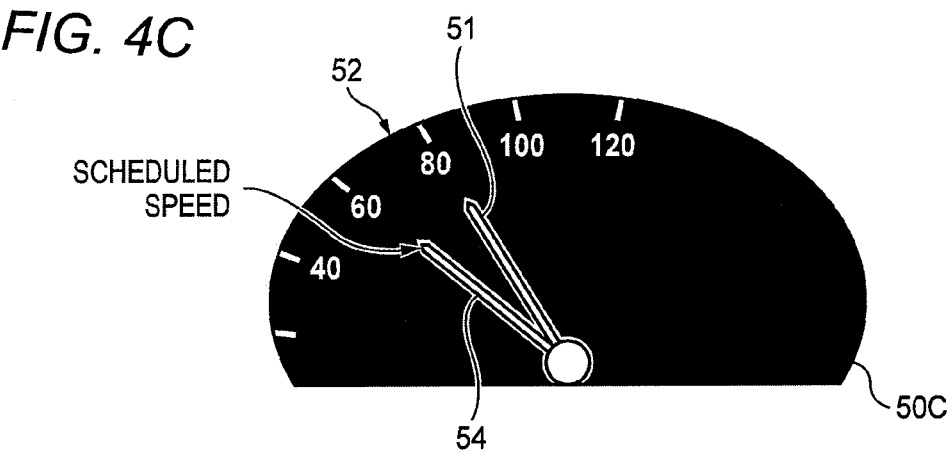

<Expression Form of FIG. 4C>

In the expression form shown in FIG. 4C, on a dial of an analog speedometer 50C, a virtual pointer 54 indicating a scheduled speed at a different speed position on a scale 52 from the pointer 51 is displayed together with the pointer 51 in a color different from that of the pointer 51.

That is, in the example shown in FIG. 4C, since the virtual pointer 54 indicates a lower speed on the scale 52 than the normal pointer 51, the driver can associate that an action of decreasing the vehicle speed is scheduled to be performed. Conversely, if the virtual pointer 54 is displayed so as to indicate a higher speed on the scale 52 than the normal pointer 51, the driver can associate that an action of increasing the vehicle speed is scheduled to be performed.

The virtual pointer 54 shown in FIG. 4C may be displayed in a special state such as blinking. As a result, it can be expressed that a position of the virtual pointer 54 indicates an action schedule different from that of the pointer 51.

<Case of Using Portion of Steering Wheel>

Figure 5:
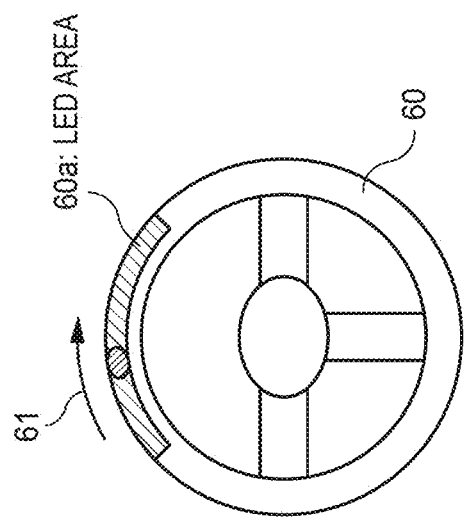
FIG. 5 is a front view showing a specific example of an expression form in a case of transmitting information using a portion of a steering wheel.

A specific example of an expression form in a case of transmitting the information using a portion of a steering wheel is shown in FIG. 5.

In the example shown in FIG. 5, an LED area 60*a* is formed on an upper portion along a circumference of a steering wheel 60. That is, a large number of LED (light emitting diode) elements are arranged in a circular arc shape along the circumference and embedded in the steering wheel 60.

In the example shown in FIG. 5, a light emitting area moving direction 61 is expressed by the information output control unit 20 controlling the light emission of each LED of the LED area 60*a*. That is, the information output control unit 20 sequentially controls the LED elements of the LED area 60*a* in a state where a light emitting position moves so as to flow in the same direction as the steering wheel 60 rotates with respect to the steering action schedule.

That is, in the example shown in FIG. 5, since the light emitting area moving direction 61 represents movement to the right, the driver can associate that an action to steer to the right is scheduled to be performed. Conversely, if the LED area 60*a* is controlled such that the light emitting area moving direction 61 is leftward, the driver can associate that an action to steer to the left is scheduled to be performed.

<Case of Using Speedometer Display 71>

Figure 6:
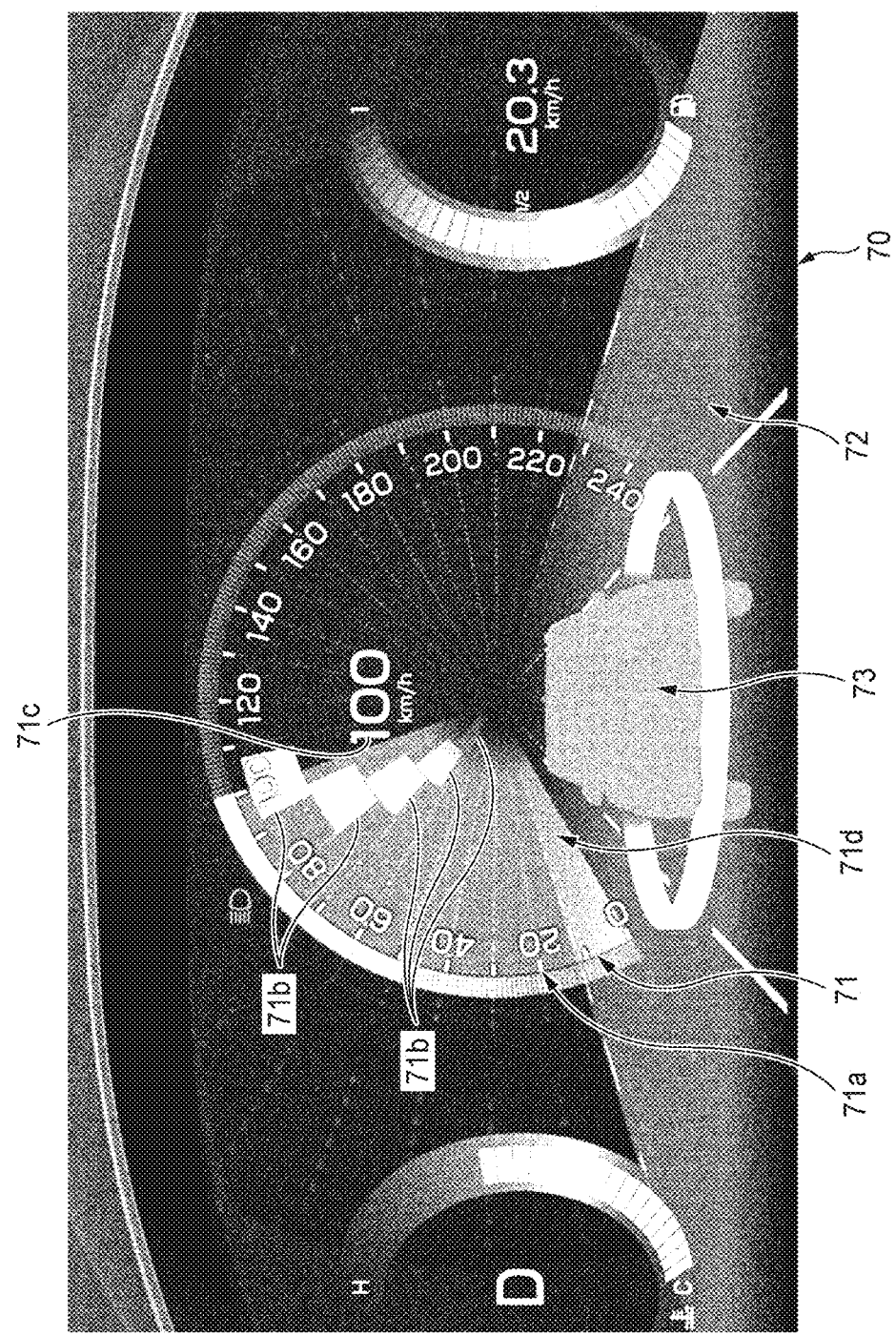
FIG. 6 is a front view showing a specific example of an expression form in a case of transmitting information using a speedometer display.
Figure 7:
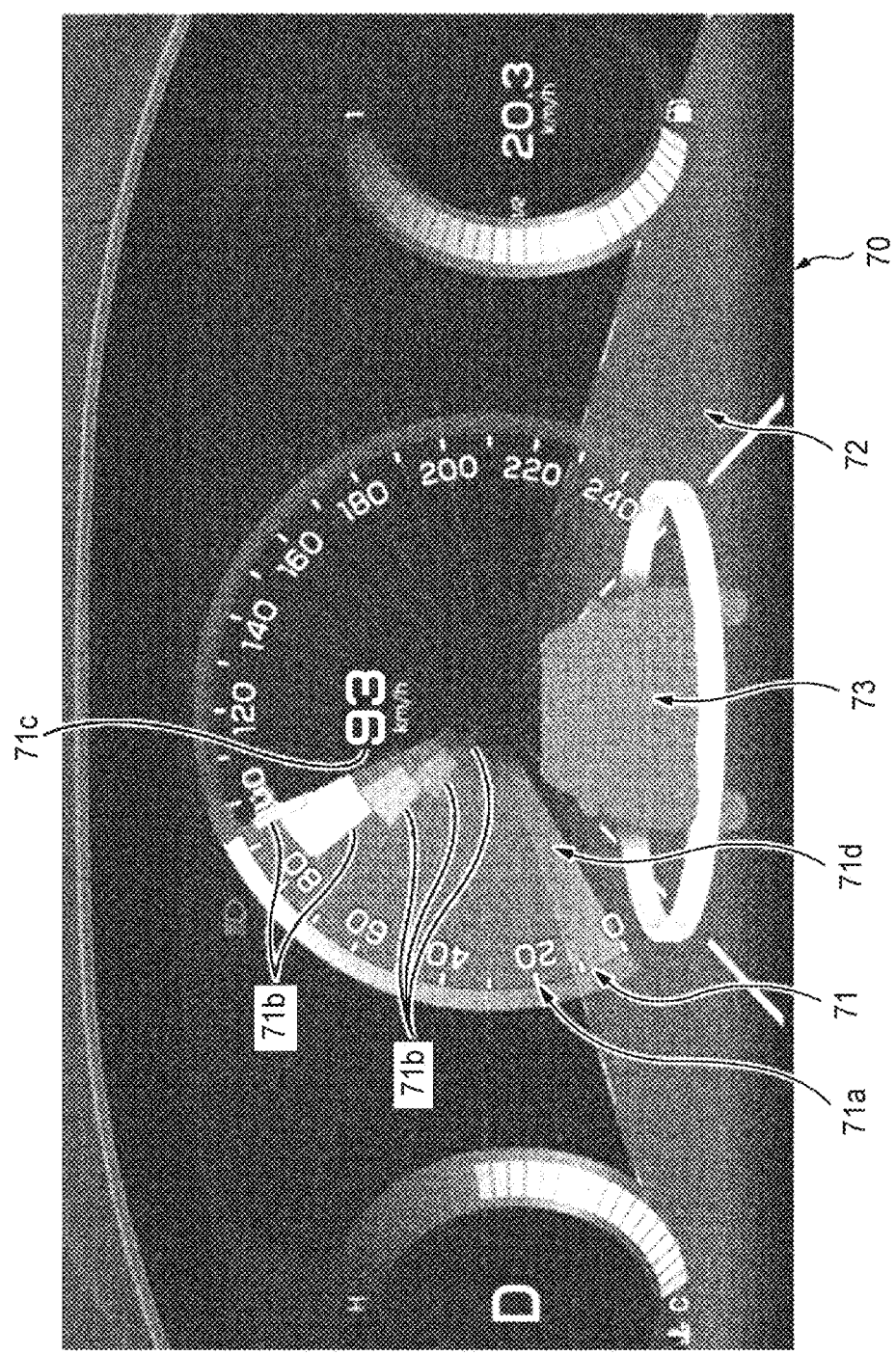
FIG. 7 is a front view showing a specific example of the expression form after a predetermined time has elapsed from FIG. 6.
Figure 8:
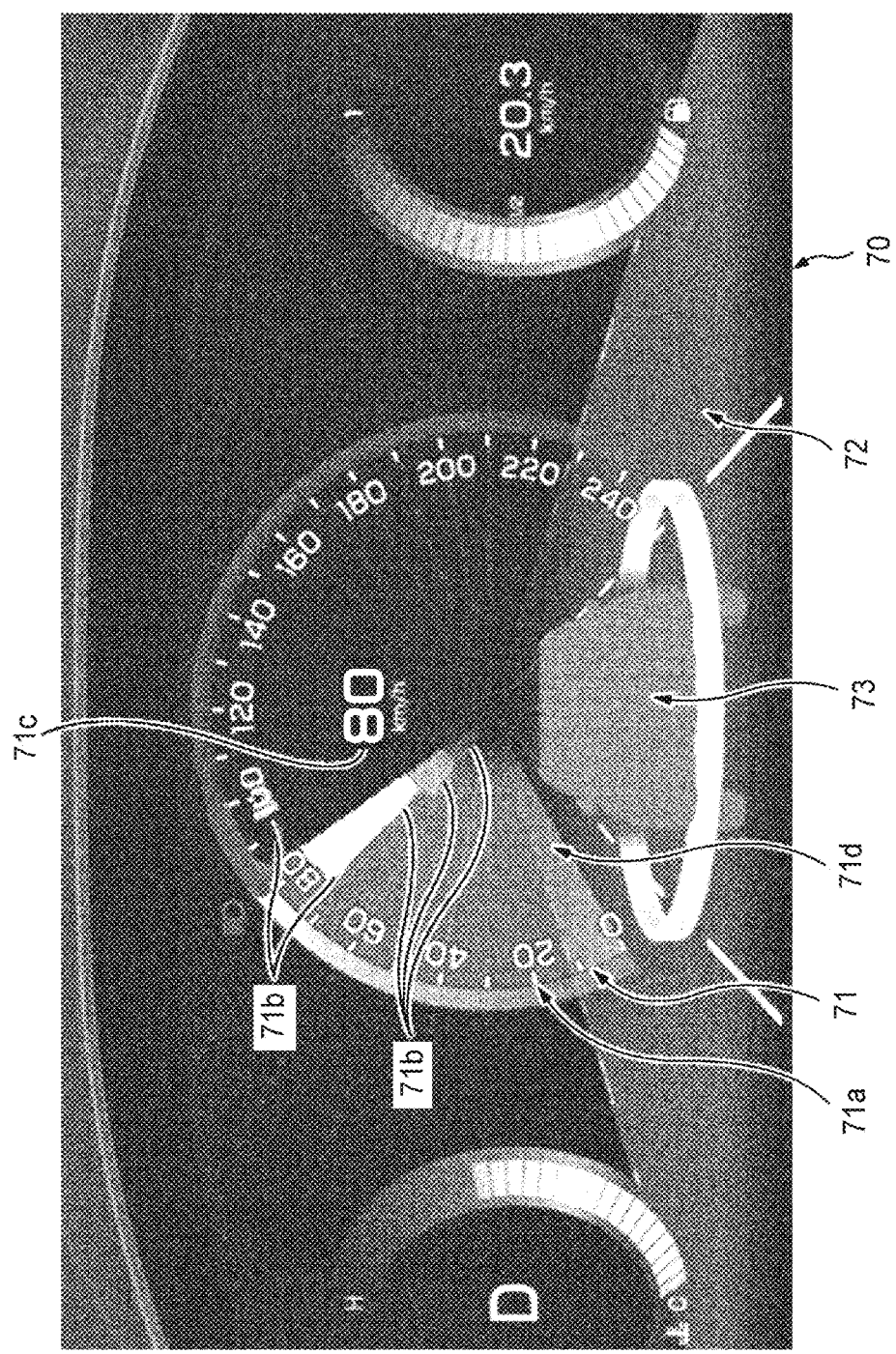
FIG. 8 is a front view showing a specific example of the expression form after a predetermined time has elapsed from FIG. 7.

FIGS. 6 to 8 are specific examples of an expression form in a case of transmitting the information using a speedometer display 71.

In the example shown in FIG. 6, the speedometer display 71 is realized by image drawing using display of a meter panel 70 arranged in front of the driver seat. In addition, in a panel background area 72 on the meter panel 70, an own vehicle pattern 73 and an image pattern equivalent to a scene such as the road ahead of the own vehicle which can be visually recognized from a viewpoint position of the driver are displayed in a state representing a sense of perspective. In addition, the panel background area 72 is displayed in a state where a dial area 71d is superimposed on the transparent speedometer display 71. Further, an infinity point of the road in the image pattern displayed in the panel background area 72, that is, a vanishing point (FOE) of movement, and a center of the dial area 71d of the speedometer display 71 are aligned so as to substantially coincide with each other.

The speedometer display 71 shown in FIG. 6 includes the dial area 71d having a substantially circular shape in the same manner as the analog speedometer, and a speedometer scale part 71a arranged along a circumference of the dial area 71d. The speedometer display 71 further includes a pointer equivalent block group 71b and a speed value display part 71c.

The speed value display part 71c shown in FIG. 6 represents that the current vehicle speed is "100 [km/h]" by a numerical value and a character. The pointer equivalent block group 71b includes five block-like patterns, and regarding a position of each of the block-like patterns, a circumferential direction of the dial area 71d represents the vehicle speed, and a direction from the outer periphery of the dial area 71d toward the center (the same as the infinity point of the displayed road) represents a time axis. Incidentally, the block-like pattern is not limited to a rectangular pattern as shown in FIG. 6 (a fan shape accurately in FIG. 6), but means a pattern having a predetermined area, such as a circular shape, an elliptical shape, a shape formed by a curve and a straight line, a polygonal shape, or a combination thereof.

In the example of FIG. 6, the (largest) block-like pattern closest to the speedometer scale part 71a indicates a position of "100 [km/h]" of the speedometer scale part 71a which is the current vehicle speed, in the same manner as a general pointer. In addition, since the other block-like patterns position different circumferential positions, the other block-like patterns represent different vehicle speed from the current ones. That is, it means that the vehicle speed of the own vehicle expected at each time earlier than the current time is different from the current vehicle speed, and is understood that the own vehicle is scheduled to be decelerated to 60 [km/h] in the example of FIG. 6.

In the example shown in FIG. 6, the dial area 71d is divided into two areas with the current vehicle speed (100 [km/h]) of the speedometer scale part 71a as a boundary. Further, in an area lower than the current vehicle speed, the dial area 71d is displayed in a bright state, and in an area higher than the current vehicle speed, the dial area 71d is displayed in a dark state. That is, similar to the case of the analog speedometer 50 shown in FIG. 4A, the expression form of the dial area 71d is controlled so as to reflect the action schedule of the own vehicle in the difference in brightness.

In the example shown in FIG. 6, as described above, the pointer equivalent block group 71b represents not only the current vehicle speed but also the schedule of the vehicle speed change due to the difference in time. That is, in front of a course of the own vehicle, an action schedule to decrease or increase the vehicle speed than the present is represented by changing the shape of the pointer using the pointer equivalent block group 71b. Therefore, the driver can intuitively and instantaneously grasp that there is a deceleration or acceleration action schedule from the shape of the pointer equivalent block group 71b displayed on the dial area 71d. In addition, the speed used as a target can also be grasped by the action schedule.

FIG. 7 shows a state after a predetermined time has elapsed from FIG. 6. With the deceleration, in a first block-like pattern closest to the speedometer scale part 71a, the display in an area higher than the current vehicle speed is turned off. At the same time, a second block-like pattern positioned closer to a center side of the dial area 71d than the block-like pattern is enlarged in a direction of the speedometer scale part 71a, that is, in an outer peripheral direction.

FIG. 8 shows a state after a predetermined time has further elapsed from FIG. 7. The second block-like pattern has already been turned off. In addition, a third block-like pattern is enlarged in the direction of the speedometer scale part 71a, and the display in an area higher than the current vehicle speed is turned off. When the own vehicle is further decelerated, the block-like pattern displayed on the outermost side of the pointer equivalent block group 71b is turned off in an area higher than the current vehicle speed, and the block-like pattern positioned an inner side of the block-like pattern is enlarged in the outer peripheral direction.

The block-like patterns of the pointer equivalent block group 71b may be displayed in an order from a peripheral position close to the speedometer scale part 71a toward the center of the speedometer and the displayed infinity point of the road. That is, the pointer equivalent block group 71b may be displayed so as to flow in the traveling direction of the own vehicle.

<Advantages of Automatic Driving Information Transmission Method and In-Vehicle Information Presentation Device>

For example, by performing the control in the procedure shown in FIG. 3, the in-vehicle information presentation apparatus 100 can transmit the action schedule of the system at the scheduled action point P1 shown in FIG. 1 to the driver at the scheduled action presentation start point P2 before the scheduled action point P1, for example. Therefore, when the driver confirms in advance that the action schedule which the driver thinks and the action schedule of the system coincide with each other, the driver can watch over the automatic driving action of the system without feeling anxiety.

Moreover, unlike an explicit expression such as an output of a message, since the information is transmitted by a weak indirect expression, the driver does not feel troublesome. That is, in the case of the expression forms as shown in FIGS. 4 (*a*), 4B, 4C, 5, and 6, since the driver can intuitively and instantaneously grasp the action schedule of the system, the driver does not receive more stimulation than necessary.

For example, even in a state where the driver is watching a moving image unrelated to the driving, for example, in the case of the expression forms as shown in FIGS. 4 (*a*), 4B, 4C, 5, and 6, the driver can receive the information with a feeling of noticing the action schedule of the system, and thus it is possible to continue watching the moving image with confidence. Therefore, the presentation of the information does not impair the comfort of the automatic driving.

Here, the characteristics of the automatic driving information transmission method and the in-vehicle information presentation apparatus according to the embodiment of the present invention are briefly summarized in the following [1] to [7], respectively.

[1] An automatic driving information transmission method which presents, on an automatic driving vehicle mounted with an automatic driving control unit configured to recognize situations in front of and around a traveling direction of an own vehicle and generate an action schedule related to driving of the own vehicle based on a result of the recognition, information corresponding to the action schedule to a driver of the automatic driving vehicle, the method including:

in a case where the automatic driving control unit generates the action schedule, at a timing (corresponding to the scheduled action presentation start point P2) with a margin with respect to a time point at which the action schedule is performed (corresponding to the scheduled action point P1), controlling a display device or an illumination device which can be viewed by the driver; and indirectly representing information related to a target speed of the action schedule by at least one of an area, a direction, and movement of the display or illumination (see FIGS. 4 (a), 4B, 4C and 5).

[2] The automatic driving information transmission method according to the above [1], wherein a background area of a speedometer (analog speedometers 50, 50B and 50C) of the own vehicle is divided into at least two background areas with a vicinity of a pointer (51) as a boundary, and the action schedule is indirectly represented by a difference in the display or illumination of the two background areas (see FIG. 4A).

[3] The automatic driving information transmission method according to the above [1], wherein an arrow pattern (53) or a virtual pointer pattern (virtual pointer 54) representing a change in a speed corresponding to the action schedule is displayed in a vicinity of a pointer (51) of a speedometer of the own vehicle.

[4] The automatic driving information transmission method according to the above [1], wherein a plurality of block-like patterns (pointer equivalent block groups 71b) are displayed on a speedometer of the own vehicle, wherein in a position of each of the block-like patterns, a direction from an outer periphery of the speedometer to a center represents a time axis, and a circumferential direction represents a speed, and wherein in the plurality of block-like patterns, the block-like pattern closest to the outer periphery is arranged at a position representing the current speed in the circumferential direction, and the block-like pattern close to the center is arranged so as to be closer to a position representing a target speed of the action schedule in the circumferential direction (see FIGS. 6 to 8).

[5] The automatic driving information transmission method according to the above [1], wherein a display or an illumination moving in a steering direction corresponding to the action schedule is output on or in a vicinity of a steering wheel (60) of the own vehicle (see FIG. 5).

[6] An in-vehicle information presentation apparatus (100) which is configured to present, on an automatic driving vehicle mounted with an automatic driving control unit (10) configured to recognize situations in front of and around a traveling direction of an own vehicle and generate an action schedule related to driving of the own vehicle based on a result of the recognition, information corresponding to the action schedule to a driver of the automatic driving vehicle, the apparatus including:

an information output control unit (20) configured to output information related to the action schedule, wherein the information output control unit is configured to control a display device or an illumination device which can be viewed by the driver, and indirectly represent information related to a target speed of the action schedule by at least one of an area, a direction, and movement of the display or illumination at a timing with a margin with respect to a time point at which the action schedule is performed, in a case where the automatic driving control unit newly generates the action schedule.

[7] The in-vehicle information presentation apparatus according to the above [6], wherein the information output control unit displays a plurality of block-like patterns (pointer equivalent block groups 71b) on a speedometer of the own vehicle, wherein in a position of each of the block-like patterns, a direction from an outer periphery of the speedometer to a center represents a time axis, and a circumferential direction represents a speed, and wherein in the plurality of block-like patterns, the block-like pattern closest to the outer periphery is arranged at a position representing the current speed in the circumferential direction, and the block-like pattern close to the center is arranged so as to be closer to a position representing a target speed of the action schedule in the circumferential direction (see FIGS. 6 to 8).

Although the present invention has been described in detail with reference to the specific embodiment, it will be apparent to those skilled in the art that various changes and modifications can be made without departing from the spirit and scope of the present invention.

The present application is based on a Japanese patent application (No. 2017-090566) filed on Apr. 28, 2017, the contents of which are incorporated herein by reference.

INDUSTRIAL APPLICABILITY

According to the present invention, there is an effect that it is possible to provide the automatic driving information transmission method and the in-vehicle information presentation apparatus which are useful for suppressing the anxiety of the occupant such as the driver with respect to the action of the system and ensuring the comfort of the automatic driving when the own vehicle is traveling by the automatic driving. The present invention having the effect is useful for an automatic driving information transmission method and an in-vehicle information presentation apparatus which can be used in a vehicle capable of the automatic driving.

REFERENCE SIGNS LIST 10 automatic driving control unit
12 road map database
13 position detection unit
14 in-vehicle camera
15 radar
16 accelerator control unit
17 brake control unit
18 steering control unit
20 information output control unit
21 display output device
22 illumination output device
23 sound/audio output device
24 vibration output device 25 odor output device
41 road
41a sharp curve point
42 own vehicle
43 margin distance
50, 50B, 50C analog speedometer
51 pointer
52 scale
53 arrow pattern
54 virtual pointer
60 steering wheel
60a LED area
61 light emitting area moving direction
70 meter panel
71 speedometer display
71a speedometer scale part
71b pointer equivalent block group
71c speed value display part
71d dial area
72 panel background area
73 own vehicle pattern
100 in-vehicle information presentation apparatus
P1 scheduled action point
P2 scheduled action presentation start point
SG01 automatic/manual switching instruction
SG10 action schedule information
SG12, SG13, SG14, SG15 input information
SG16, SG17, SG18 output signal
SG21, SG22, SG23, SG24, SG25 output signal

The invention claimed is:

1. An automatic driving information transmission method which presents, on an automatic driving vehicle mounted with an automatic driving control unit configured to recognize situations in front of and around a traveling direction of an own vehicle and generate an action schedule related to driving of the own vehicle based on a result of the recognition, information corresponding to the action schedule to a driver of the automatic driving vehicle, the automatic driving information transmission method comprising:

in a case where the automatic driving control unit generates the action schedule, at a timing with a margin with respect to a time point at which the action schedule is performed, controlling a display device or an illumination device which can be viewed by the driver; and indirectly representing information related to a target speed of the action schedule by at least one of an area, a direction, and movement of the display or illumination, wherein a plurality of block-like patterns are displayed on a speedometer of the own vehicle, wherein in a position of each of the block-like patterns, a direction from an outer periphery of the speedometer to a center of the speedometer represents a time axis, and a circumferential direction of the speedometer represents a speed, and wherein in the plurality of block-like patterns, the block-like pattern closest to the outer periphery is arranged at a position representing the current speed in the circumferential direction, and the block-like pattern close to the center is arranged so as to be closer to a position representing a target speed of the action schedule in the circumferential direction.

2. An automatic driving information transmission method which presents, on an automatic driving vehicle mounted with an automatic driving control unit configured to recognize situations in front of and around a traveling direction of an own vehicle and generate an action schedule related to driving of the own vehicle based on a result of the recognition, information corresponding to the action schedule to a driver of the automatic driving vehicle, the automatic driving information transmission method comprising:

in a case where the automatic driving control unit generates the action schedule, at a timing with a margin with respect to a time point at which the action schedule is performed, controlling a display device or an illumination device which can be viewed by the driver; and indirectly representing information related to a target speed of the action schedule by at least one of an area, a direction, and movement of the display or illumination, and wherein a display or an illumination moving in a steering direction corresponding to the action schedule is output on or in a vicinity of a steering wheel of the own vehicle.

3. An in-vehicle information presentation apparatus which is configured to present, on an automatic driving vehicle mounted with an automatic driving control unit configured to recognize situations in front of and around a traveling direction of an own vehicle and generate an action schedule related to driving of the own vehicle based on a result of the recognition, information corresponding to the action schedule to a driver of the automatic driving vehicle, the in-vehicle information apparatus comprising:

an information output control unit configured to output information related to the action schedule, wherein in a case where the automatic driving control unit newly generates the action schedule, the information output control unit is configured to control a display device or an illumination device which can be viewed by the driver, and indirectly represent information related to a target speed of the action schedule by at least one of an area, a direction, and movement of the display or illumination at a timing with a margin with respect to a time point at which the action schedule is performed, wherein the information output control unit displays a plurality of block-like patterns on a speedometer of the own vehicle, wherein in a position of each of the block-like patterns, a direction from an outer periphery of the speedometer to a center represents a time axis, and a circumferential direction of the speedometer represents a speed, and wherein in the plurality of block-like patterns, the block-like pattern closest to the outer periphery is arranged at a position representing the current speed in the circumferential direction, and the block-like pattern close to the center is arranged so as to be closer to a position representing a target speed of the action schedule in the circumferential direction.

* * * * *